United States Patent [19]
Castel

[11] Patent Number: 4,878,694
[45] Date of Patent: Nov. 7, 1989

[54] METHOD AND DEVICE FOR THE REMOTE POSITIONING OF AN ELBOW COUPLING

[75] Inventor: Yvon Castel, Croissy S/Seine, France

[73] Assignee: Institut Francais du Petrole, Rueil-Malmaison, France

[21] Appl. No.: 66,204

[22] Filed: Jun. 25, 1987

[30] Foreign Application Priority Data

Jun. 26, 1986 [FR] France ................................ 86 09421

[51] Int. Cl.$^4$ ........................................... F16L 35/00
[52] U.S. Cl. ..................................... 285/24; 285/179; 141/279; 405/169
[58] Field of Search ...................... 285/18, 179, 24, 25, 285/26, 27, 28, 29; 141/279; 405/169

[56] References Cited

U.S. PATENT DOCUMENTS

| | | |
|---|---|---|
| 1,635,782 | 7/1927 | Dreibelbis . |
| 3,299,950 | 1/1967 | Shatto, Jr. . |
| 3,481,396 | 12/1969 | Williams et al. . |
| 3,490,609 | 1/1970 | Poole . |
| 3,633,667 | 1/1972 | Falkner ............................. 285/18 X |
| 3,717,002 | 2/1973 | O'Brien et al. .................... 285/18 X |
| 3,921,684 | 11/1975 | Allen . |
| 4,041,720 | 8/1977 | Lebourg .......................... 285/18 X |
| 4,120,171 | 10/1978 | Chateau et al. . |
| 4,182,584 | 1/1980 | Panicker et al. . |
| 4,273,470 | 6/1981 | Blomsma et al. . |
| 4,392,790 | 7/1983 | Shibata et al. .................... 285/24 X |
| 4,400,112 | 8/1983 | Castel et al. . |
| 4,501,056 | 2/1985 | Castel et al. . |
| 4,541,755 | 9/1985 | Castel et al. . |
| 4,625,805 | 12/1986 | Ladecky . |
| 4,634,150 | 1/1987 | Forster ................................ 285/24 |
| 4,643,614 | 2/1987 | Laursen . |

FOREIGN PATENT DOCUMENTS

| | | | |
|---|---|---|---|
| 64004 | 11/1982 | European Pat. Off. ............. | 285/24 |
| 2284080 | 4/1976 | France ................................ | 285/18 |
| 39209 | 3/1977 | Japan ................................... | 285/18 |

OTHER PUBLICATIONS
European Search Report.

*Primary Examiner*—Dave W. Arola
*Attorney, Agent, or Firm*—Antonelli, Terry & Wands

[57] ABSTRACT

A method and device are provided for the remote positioning of an elbow coupling from a main installation situated above the distant installation. The device or frame supports the coupling and is held at the level of a suspension member by means of a support element such as a cable for being possibly immobilized on the distant installation. The suspension member allows movements of the frame in a horizontal plane with respect to the end of the cable. The support member may move along three axes orthogonal to each other by means of jacks and in rotation about a vertical axis. These two members allow the frame and the elbow coupling to be positioned as well as the end of the coupling to be connected to a first line connected to the distant installation. The frame may include a clamp for connecting a second end of the coupling to the end of a second flexible line.

15 Claims, 7 Drawing Sheets

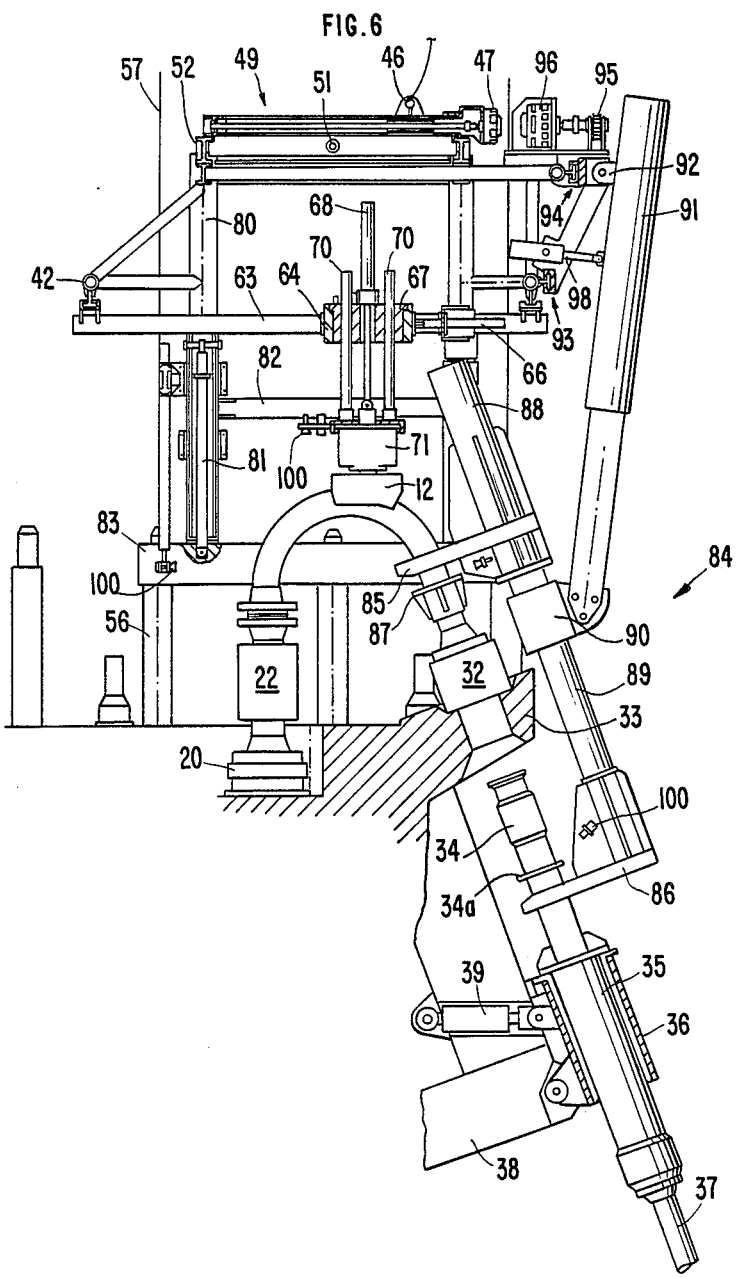

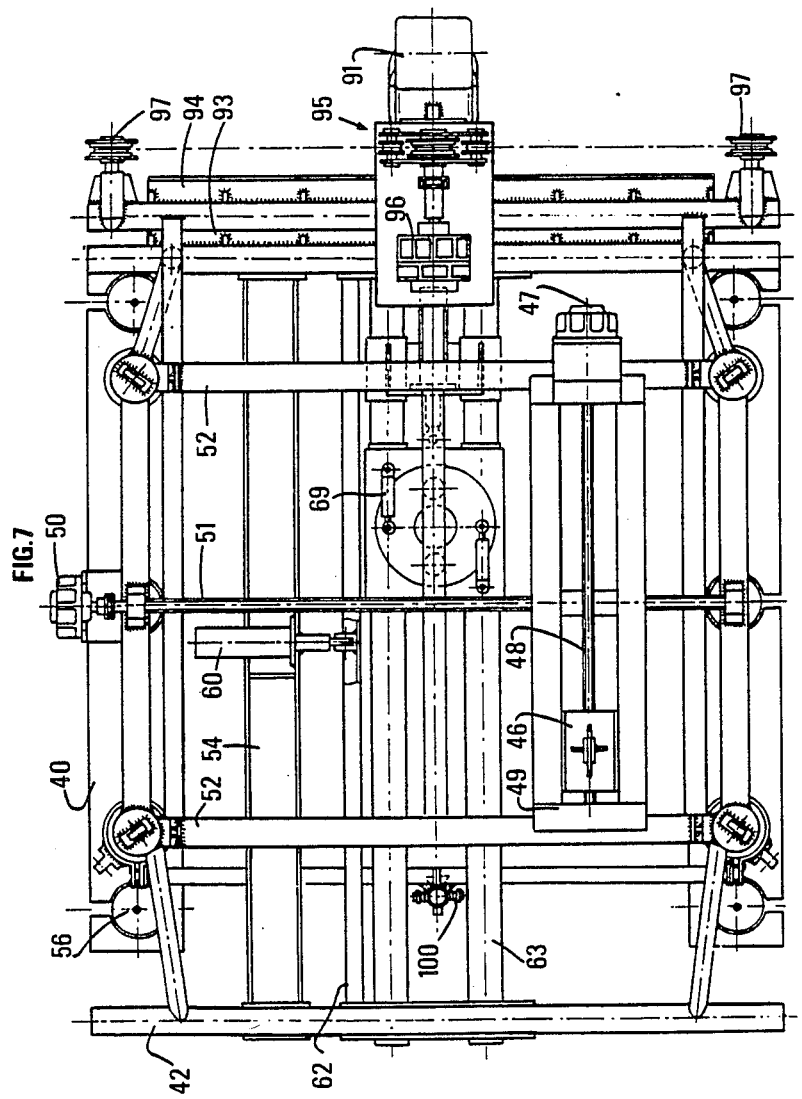

4,878,694

METHOD AND DEVICE FOR THE REMOTE POSITIONING OF AN ELBOW COUPLING

The present invention relates to a method and device for the remote positioning of an elbow coupling or gooseneck coupling, to a distant installation from a main installation.

The connection is made between the ends of two pipes.

This invention may be applied more particularly to the field of offshore oil effluent production when it is a question of connecting the end of a riser immersed to a certain depth from a main installation situated above the distant installation, with the main installation being possibly a surface ship and the remote installation being possibly an immersed buoy, with the depth of immersion being about 100 m.

Up to now such connections raised maintenance problems and required divers, which limited the depth at which they could be formed.

SUMMARY OF THE INVENTION

The present invention overcomes these problems by providing a device for the remote postioning of an elbow coupling on a distant installation from a main installation which is situated above the distant installation. This device includes a support frame, with the elbow coupling having a least two ends one of which cooperates with an end of a first line connected to the distant installation, and the frame including a member for suspending it from a support element connected to the main installation and a support member of the elbow coupling, and with the members being fixed to the said frame. The device is more particularly characterized in that at least one of the members is mobile with respect to the frame.

The support member or suspension member may include means for movement relative to the device in a plane substantially perpendicular to the axis of the support element.

The support member may be mobile and be associated with positioning means including in combination an approach member and a positioning member, the approach member producing a translational movement along an axis of a cross piece on which the positioning member is placed. The positioning member is adapted to perform at least one rotation and at least two translational movements, with the directions of the translational movements not forming a zero angle therebetween and being both perpendicular to the approach translation axis, and with the rotation having its axis parallel to the approach translation axis.

The device may include means adapted for connecting a second end of the joint or connection with an end of a second line by movement in the same alignment of the end of the second line and the second end of the coupling.

The device for connecting one of the couplings to an end of a line may include a lockable connector for connecting and locking the connector.

This device may include means for controlling the connector for locking the connector from the main installation.

The device may include means for immobililzing the frame on the distant installation.

The approach member may include at least one pulley jack.

The approach member may include at least one jack whose axis is substantially parallel to the approach translation axis and the jack may be situated inside the uprights of the device.

The invention also provides the remote connection method using the device, including, more particularly, the succession of the steps lowering the frame from the main installation to a distance installtion by the support element, and carrying out a combination of movements of the support element in either of the support member or the suspension member so as to place the coupling in a predetermined position.

After placing the coupling in the predetermined position, a first connection may be made of the first end of the coupling with the first end of the first line. After carrying out this step, the end of the second line may be aligned with the end of the coupling and they may then be brought together so as to form a second effective connection of these two elements.

The connections with the lockable connectors being provided, locking of the first connection may be carried out before or simultaneously with that of the second connection.

One or other of the connections may be made from the main installation.

BRIEF DESCRIPTION OF THE DRAWINGS

The present invention will be better understood and its advantages will be more clearly apparent from the following description, which is in no wise limitative, of two particularly embodiments with reference to the accompanying Figures in which:

FIG. 6 is a partial cross-sectional view of another embodiment of a device for positioning and connecting the gooseneck coupling; and FIG. 7 is a top view of a device illustrated in a front view of FIG. 6.

DESCRIPTION OF THE PREFERRED EMBODIMENTS

Figure 1:
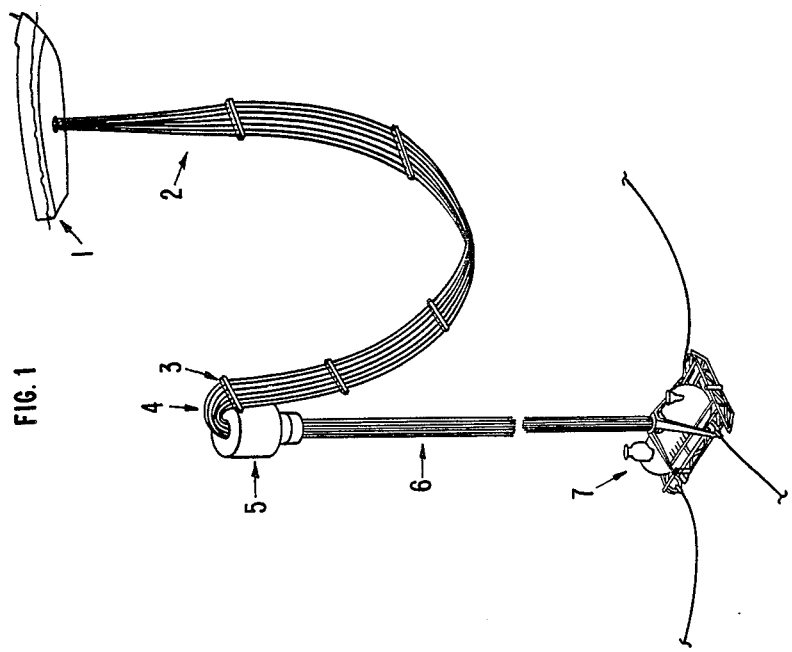
FIG. 1 is a general perspective view of an oil production riser in connection thereof to ship by transfer lines.

The following description relates to the particular case of positioning and connecting couplings generally designated by the reference numeral 4 in the form of a gooseneck (FIG. 1), on the one hand, to the upper ends of pipes generally designated by the reference numeral 6 for transferring the production of an undersea production site, with these ends being coupled to an immersed buoy generally designated by the reference numeral 5 and, on the other hand, to the ends of the transfer lines generally designated by the reference numeral 2 situated at the level of a bar generally designated by the reference numeral 3. Each of the couplings normally only provides connection of a single pipe to a single line. The bundle of transfer lines 2 may be connected to a ship generally designated by the reference numeral 1 situated at the water surface and may serve for conveying the production from the undersea well to ship 1. The set of transfer pipes is connected at its lower part to a base 7 placed on the seabed and serving as connector for the well or wells.

For the purpose of clarity, all the control lines, particularly electric or hydraulic, which remotely provide the difference possible operations of the device of the invention have not been shown.

Figure 2:
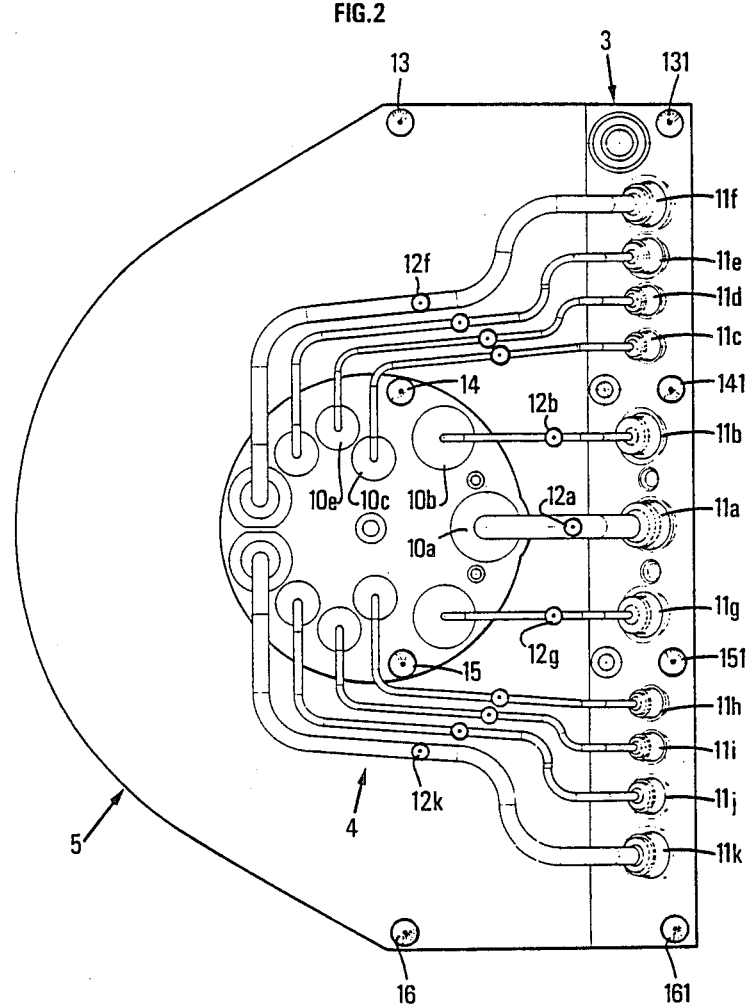
FIG. 2 is a top view of an arrangement of gooseneck couplings to an underwater buoy.

In FIG. 2, depicting a top view of a general arangement of the gooseneck couplings to a buoy 5, the references beginning with the reference numeral 10 are relative to the first connectors of the couplings, with the reference numerals 11 being related to the second connectors of the couplings and the reference numerals 12 being related to the mandrels for handling and controlling each of the couplings designated by the reference characters a, b, c, ... k, the gooseneck couplings a ... k which are shown in FIGS. 1, 2 and 6 are of the simplified type and only include a minimum number of elements. Each of these couplings may be specialized in one application in dependence upon the line and the pipe to which it is connected. For example, the coupling a may be related to the collecting of all the effluents from the well; the reference character b may be related to the hydraulic controls at the head of the well; the reference character c may be related to the air supply for a diving capsule; the reference characters d and i may be related to the discharge of air from a diving capsule; the reference numeral e may be related to the nitrogen drain of the diving capsule; the reference numeral f may be related to the injection of water into the well; the reference character g may be related to the injection of a lift gas; the reference character h may be related to the nitrogen intake for the diving bell when it is not used; the reference character j may be related to tests and servicing in the vertical lines such as, for example, scraping; and the reference character k may be related to the injection of a gas into the well.

The diameters of the couplings are adapted to the service requirements which depend more particularly on the characteristics of the fluids likely to flow through the couplings as well as their flow rates.

The configuration of the couplings is adapted so as to provide ready access for handling thereof, while taking into acount their weight, for example, for the simplified couplings may raach about 5000 daN and their length which may reach, for example, 7 to 8 m, considering a buoy width of support length determined by the bar 3, for example, of about 12m.

The mandrels for handling and controlling the couplings, such as mandrel 12a, are preferably situated in line with the center of gravity of the couplings, when they are in their operational position.

Guide posts 13, 131, 14, 141, 15, 151, 16, 161, which ensure positioning and immobilization of the coupling connection and positioning device, are disposed so that the device may occupy several juxtaposed positions above the handling and control mandrels. In FIG. 2, the alignment of posts 13 and 14, 15, and 16 is parallel to that of posts 131, 141, 151, 161. Moreover, the guide posts, 13, 14 or 14, 15 or 15, 16 or 131, 141 or 141, 151 or 151, 161 are equidistant from each other so that the device may occupy three positions, more particularly for optimizing the dimensions of the device.

When the device of the invention is positioned on the posts 13, 141 14, and 131, it may handle couplings 11c, 11d, 11e and 11f. Thus, the device of the invention may handle several couplings from the same position.

For narrower buoy dimensions, the number of posts could, for example, be limited to six or even to four, with the number of three guide posts being the minumum for providing isostatism of the device.

At the upper end of the guide posts, a guide line may be disposed rising up to a surface installation, such as a ship 1, from which the device of the invention is lowered. These lines may be laid, four at a time, by a device such of the type described in, for example, French patent application FR-A-2 529 253. The minimum number of such lines being, for each position of the coupling positioning device, possibly reduced to two so as to guide and prevent any rotation of the device. Thus, on an immersed buoy having four guide posts, the number of guide lines to be laid may be reduced to four, for example, by placing them on posts 13, 141, 15 and 161.

As assembly for fixing the guide line to a guide post, a disconnectable connection device may be used of the type described in, for example, French patent FR-A-2 497 899. thus using a disconnecting tool such as described in, for example, French patent application FR-A-2 525 682, the guide line may be withdrawn once it has been used.

Figure 3:
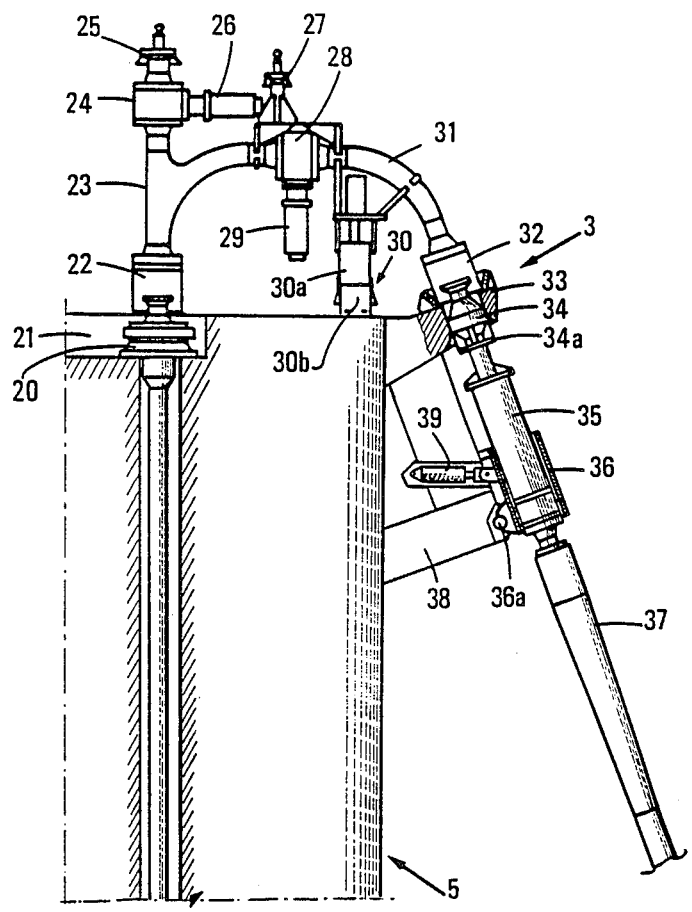
FIG. 3 is a partial cross-sectional view of a detail of the arrangements of the elements of the pipes for the transfer of oil effluents to a main installation such as, for examnple, a buoy.

FIG. 3 shows in detail, on a main installation such as a buoy 5, the arrangement of the pipe elements for transfer of oil effluents using a coupling in in the form of a multifunctional gooseneck.

The end 20 of the transfer pipe cooperates with a first lockable connector 22 for transferring fluids. The ends of the transfer pipes are placed on the buoy 5 in the same dish 21. Instead of being connected to the end of a transfer pipe connected to the distant installation, one of the ends or the bent elbow coupling could cooperate with any type of complementary element connected to the installation, this element being, for example, an electric power or measuring socket or any end of a line to be connected to a bent coupling.

Connector 22 is connected to a Y sleeve 23 which is divided at its upper part into two branches one of which is situated in the axis of the pipe. This axial branch is, in normal service, closed by the draw off valve 24, this with the valve 24 being actuated by a mechanism 26. The Y sleeve 23 may include a deflector or part with bevelled section which normally closes the axial branch but by retraction allows tools, such as scraping tools, to pass through this axial branch.

This axial branch ends in a connection mandrel 25, which is covered when not in service by an anti-corrosion cap. This mandrel allows the axial branch of the coupling to be connected to a pipe lowered from the surface, with this pipe being used when it is desired to have direct access to the transfer pipe. This may more particularly occur during cleaning of the pipe or lowering of tools through this same pipe, the deflector retracting in this case and subsequently coming back into position.

In the lateral branch of the Y sleeve 23 is placed an isolating valve 28 which is actuated by the mechanism 29. The two motors 26 and 29 of the two valves 24 and 28 may be connected to a hydraulic or an electrohydraulic multiconnector 30 whose upper part 30a is connected to the coupling and to the lower part 30b of the buoy. The lower part is itself connected to the suface installation by means a hose which may be one of the hoses of the bundle shown in FIG. 1.

With this multiconnector, it is possible to provide opening or closure of the valves from the surface and, if so desired, unlocking and locking of connector 31, in the case where it is desired to disconnect one or several hoses from the buoy. This type of connector is constructed by the firm MATRA A.C.B.

Control of the locking and unlocking of connectors 22 and 32 may be provided by the handling and control mandrel 27 whose functions, during positioning of the coupling, are to grip the coupling and lock it to the pipes between which it is situated.

The bend 31 provides the connection between valve 28 and a second lockable connector 32 which is centered in support 33.

This support also guides the end 34 of the flexible pipe which is mounted on a rigid part 35 of the flexible pipe. This rigid part slides inside a guide bar 36 joined by a pivot pin 36a and a jack 39 to the bracket 38. Positioning of the flexible pipe 37 in bar 36 may be provided by cable, whereas, the end of the flexible pipe is moved away from the main installation by the jack 39.

For connecting the end with the coupling at the level of connector 32, the jack 39 causes the bar 36 to pivot so as to make the axis of the connector coincide with that of the end of the flexible pipe and a tool, such as the one described in, for example, French patent application EN.85/15.500bearing on stop 34a, causes sliding of part 35 in bar 36 and engagement of the end 34 in support 33 until locking of the connection can be obtained at the level of connector 32. With the elements positioned, locking may then be provided by the mandrel 27.

For dimensions comparable to those mentioned for the simplified coupling, the multifunctional gooseneck coupling which includes parts 22 to 29, 30a, 31 and 32 may have a weight reaching 11000daN.

Figure 4:
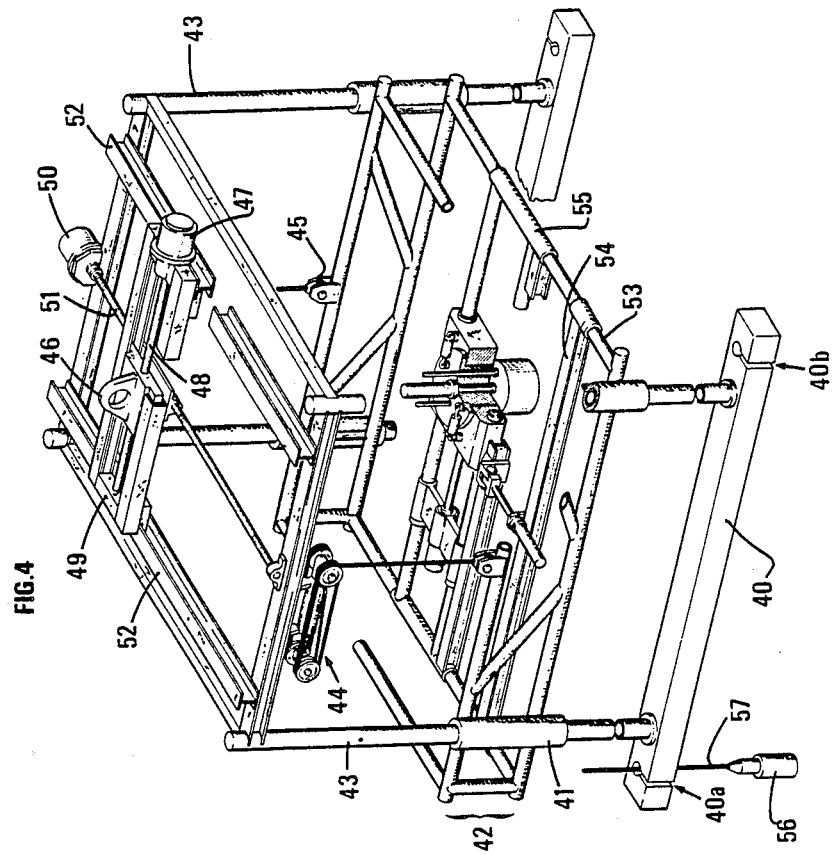
FIG. 4 is a perspective view of a device for postioning and connection the gooseneck coupling.

FIG. 4 shows a device of the invention also called frame, for positioning and connecting the gooseneck coupling.

The frame includes at its lower part two supporting cross pieces 40 in which slide at 40b at least one of the two guide lines 57 mounted on the guide posts 56. The guide lines may be introduced laterally through slits 40a of the cross piece.

With this conventional means, slits 40a are closed by doors which permit the lines 57 to remain secured to cross piece 40. On cross pieces 40 are disposed four uprights 43 joined together by a mechano-wleded structure. Four guides 41 of a mobile approach cross piece 42 slide on these uprights 43 under the action of two pulley jacks 44 fixed to the sturcture. One end of each of the cables of these pulley jacks has an eyelet connected by a shackle to fixing points 45 on each of the approach cross pieces 42.

In another embodiment, not shown, it is possible for support cross pieces 40 to be mounted for sliding over a certain part of the length of the uprights, and for the movement of these cross pieces relative to the uprights to be damped by an appropriate device so that engagement of the cross pieces with the guide posts takes place smoothly. The damping device is also adapted so that no parasite movement appears in the frame when it has been immobilized on the guide posts.

At the upper part of the frame is disposed a suspension member for suspending the frame to a support element extending from the main installation. This member may be fixed or, preferably, mobile and may include means for correcting the slant of the frame during lowering and positioning thereof on the guide posts 56. These means are connected by a ring 46 to the end of a support element, such as a cable, which is used for lowering the frame. Ring 46 moves relatively to the frame in a plane substantially perpendicular to the axis of the support element, preferably in two perpendicular directions, by two screw-nut systems driven by two motors 47 and 50. Ring 46 slides in the guides of the slant carriage 49 through screw 48 which is driven by motor 47, which may, for example, be of a hydraulic or electric type. The carriage, guided by two rails 52, slides under the action of screw 51 and motor 50 of a type similar to motor 47.

These slant means, by modifying the position of ring 46 as a function of the forces acting on the frame, such as the weight, the force of the current, Archimedes thrust. . . offers the possibility of correcting the vertical position of the frame so that it is correctly positioned during lowering to the guide posts or during raising thereof. In fact, in some cases, such as the positioning of heavy and cumbersome couplings, it is not always possible to adjust or appreciably modify the slant of the frame solely by moving the handling plate 64.

The positioning means may include a member for approaching the position to be established and a fine positioning member for obtaining this position accurately, with the fine positioning member being carried by the approach member.

Figure 5:
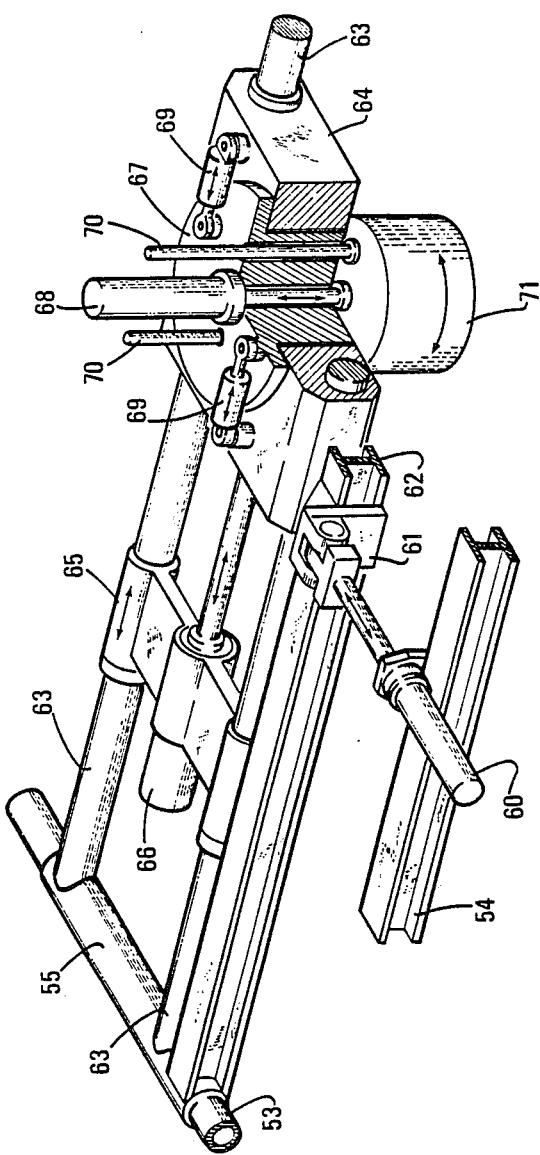
FIG. 5 is a partial cross-sectional perspective view of a detail of the carriage for positioning the device of FIG. 4.

The mobile approach cross piece 32 includes guides 53 on which the positioning carriage 55, shown in greater detail in FIG. 5, is supported. The movement of this cariage 55 along guides 53 is provided by jack 60 whose body is mounted on the adjustable stop 54. Adjustment of this stop 54 is carried out either manually, or automatically by immobilization thereof on guide 53. Brackets 61 provide the connection between the end of the rod of jack 60 and the beam 62 of the positioning carriage.

Perpendicularly to the guides 53 of the carriage and on the positioning carriage are disposed means for guiding the handling plate 64. These means may, for example, be cylindrical slides 63 cooperating with bores in the plate 64. The plate is moved over the slides by a jack 66. The body of this jack 66 is secured to a stop 65 whose position on the cylindrical slide 63 is adjustable automatically or manually, with the end of the rod of this jack 66 being connected to the plate 64.

The handling plate 64 includes a rotor 67 rotating through the action of rotating means, such as a jack 69 fixed to the plate 64 and to the rotor so as to provide angular deflection of the rotor. In FIG. 5, two jacks 69 have been shown. This solution provides a better balance of the rotational torque.

Substantially in coincidence with the axis of the rotation of the rotor is disposed a vertical positioning jack 68 whose body is connected to rotor 67 and whose rod is connected to a support member or handling connection 71 of the bent coupling situated below rotor 67. Connection 71 is coupled for rotation with the rotor by two guided rods 70 fixed to the connection and sliding in passages formed in the rotor.

The handling connection 71 is adapted for cooperating with the handling and control mandrel 27 (FIG. 3) or 12 (FIG. 2) for positioning the couplings and locking these couplings with the ends of the pipes between which they are placed.

The connection 71 and the mandrel are mechanically connected during laying and dismantling of the coupling and allow the hydraulic fluid for controlling unlocking and locking to flow therebetween as required.

When the coupling includes a hydraulic multiconnector 30a (FIG. 3), it is possible to control locking thereby. However, such locking can only take place if there exists, at the time when it is carried out, a source of hydraulic power supplying the members for locking the connector through the multiconnector. Such supply may be provided, for example, through a flexible hydraulic line which will have been previously positioned.

Even in the case where it is possible to control locking by the buoy, it is preferrable, for safety reasons, to be able to provide it also by the mandrel and the connection which cooperates therewith.

In FIGS. 4 and 5, the movements of the elements may be provided without distinction by screw-nut systems, electric or hydraulic motors, jacks or any other appropriate means. However, the man skilled in the art may adapt the choice of these means more particularly as a function of their reliability, their accuracy, their speed and their cost.

FIG. 6 shows another device for positioning and connecting the gooseneck coupling, having a clamp for connecting the flexible pipe to the coupling, in a phase of use of this clamp.

The frame, being held by ring 46 and lowered by the guide line situated in the extension of the guide posts, is immobilized at the end of its travel on guide posts 56 by the immobilization cross pieces 83. On these cross pieces are placed four telescopic uprights 80 driven by appropriate means, such as jacks. These uprights are joined together at their fixed part by cross pieces 82, 83 and at their top by cross pieces between which are placed means for slanting the frame such as those shown in FIG. 4.

In the views shown in FIGS. 6 and 7, these slant means include a carriage 49 having guides in which ring 46 slides. This ring is moved by a screw-nut system whose screw is controlled by a hydraulilc motor 47. This carriage slides in its turn over rails 52 by a screw-nut system 51 controlled by a motor 50 (FIG. 7).

The approach cross piece 42 fixed to the mobile upper parts of the uprights carries and guides plate 64 whose movements are produced more particularly by jacks 66 and 60, the directions of movement produced by these jacks being perpendicular to each other as shown in FIGS. 5 and 7.

The handling connections 71 is guided for rotation and translation by bars 70. This connection is driven vertically by jack 68 and is rotated at the same time as rotor 67 which includes ad hoc rotational means, such as one or more jacks, as shown in FIGS. 5 and 7. The handling connection 71 is fixed to the handling and control mandrel 12 integral wilth the gooseneck coupling (FIG. 6 shows the case of a simplified coupling) having at each of its ends a connector 22 and 32 adapted to be connected with ends 20 and 34 of pipes. The continuity of the conntrol line or lines for locking the connector or connectors mounted on the coupling is provided through the mandrel, the connection and a link to the control post which may be at the surface. Once the frame has been lowered, positioned and immobilized, the mobile approach cross piece 42 is lowered by the jacks disposed in the telescopic uprights (FIG. 6) or by a pulley jack (FIG. 5), so as to approach the coupling to its service position. Since adjustment of the coupling at the level of the first connector 22 with the end 20 of the transfer riser may be precise, (for example H7g6), fine movements of plate 64, of connection 71 and or rotor 67 are used for achieving this precise assembly.

In the same operation, the second connector 32 is positioned in a housing of support 33.

Then, after the end 34 of the flexible pipe has been placed in the guide bar 36 and the axis of end 34 had been placed substantially in coincidence (by jack 39) with the axis of the connector 32, a clamp 84 whose jaws 85 and 86 come to bear respectively on shoulders 87 and 34a, causes the end piece 34 to slide through the support 33 towards the connector 32 as far as a position allowing locking of the connector. Remote locking of the connectors may be carried out either after each joining of the connectors with the pipes or when two joining operations have been carried out.

Clamp 84 includes two jaws 85 and 86 which bear respectively on the shoulder of 87 of the gooseneck coupling and on the shoulder 34a of the end piece 34 of the flexible pipe 37. These jaws are both driven by a jack 88 whose body is connected to the upper jaw 85 and whose rod 89 is connected to the lower jaw 86. On this rod 89 slides a carrier mandrel 90 mounted between two stops (not shown). Such a clamp is described in greater detail in the French patent application EN 85/15.500 .The clamp is fixed by the carrier mandrel 90 to arm 91, for example, by a gusset plate. The hinged are 91 is fixed to the pin 92 of a traversing carriage movable in translation over slides 93 and 94 fixed to the frame.

The different positions which the carriage may take correspond to the different connection posts of clamp 84. Each post is situated opposite each of the second connectors 12 of the bent couplings which are situated between the uprights of the frame, which uprights rest on guide posts such as 13, 131, 14,141, or 14, 141, 15, 151, etc.

The movement of this carriage is ensured by the ends of a chain or cable forming a rectangular loop with large horizontal axis. This chain or cable is guided by four rollers 97 situated in the same plane and is driven by an arrangement of pulleys or gear wheels 95 actuated by an electric or hydraulic motor 96 fixed with respect to the frame.

The movement of the arm 91 about pin 92 which allows the clamp to be disengaged after use, is provided by jack 98.

The remote control of all the elements of the frame is assisted by display and location means 100, such as televlision cameras, if required with projectors, observing the handling spaces.

When the frame is held free without being positioned on the distant installation, the movements of the coupling for positioning thereof may be obtained solely, either by the suspension member or by the support member.

In the present description, the angle which the ends of the elbow coupling form therebetween is close to 20°, which corresponds to a shape and a curvature particularly well adapted to the flexible pipe which must be attached from the surface to a buoy immersed at about 100m under the surface of the water. It could be varied over a large range without inconvenience. An angle of 0° would allow the elbow coupling to be connected simultaneously to the ends of the two lines.

What is claimed is

1. In a device for a remote positioning of an elbow coupling to a distance installation from a main installation situated above the distance installation, said device including a support frame, said elbow coupling having at least two ends at least one of which cooperates with an end of a first line to obtain a connection between these ends, said first line being connected to said distance installation, said support frame including a suspension member for suspending the support frame from a support element connected to the main installation and a support member holding said elbow coupling with said support frame, said members being fixed to said support frame, said support and suspension member being movable relative to said support frame and along a direction not parallel to a substantially vertical axis of the support element.

2. The device according to claim 1, wherein one of said support member and suspension member include means for movement rleative to said device in a plane substantially perpendicular to said axis of said support element.

3. The device according to calim 1, further including means for immobilizing said frame on said support distance installation.

4. A remote connection method employing a device according to claim 1, the method including the following successive steps:
lowering said support frame from the main installation as far as the distance installation by the support element;
carrying out movements of the support element in combination with movements of at least one of the support member and suspension member so as to place said elbow coupling in a predetermined position.

5. The method as claimed in claim 4, wherein after placing said coupling in said predetermined position, a first connection of a first end of said coupling is effected with said end of said first line, said last mentioned end being a first end of said first line.

6. The method wherein, after carrying out the step claimed in claim 5, an end of a second line is aligned with said end of the elbow coupling and they are brought together so as to provide a second effective connection of these two elements.

7. The method as claimed in claim 1, wherein said connections are formed with lockable connectors, and wherein the locking of said first connection is performed before that of said second connection.

8. A method as claimed is claim 6 wherein said connections are formed with lockable connectors, and wherein the locking of said first connection is performed simultaneously with that of said second connection.

9. The method as claimed in one of claims 7 or 8, wherein at least one of said connections is provided from the main installation by remote means.

10. The device as claimed in claim 1, wherein said device comprises means for positioning said support member, which is supported by a cross piece, said positiloning means comprising an approach member for approaching said cross piece along a translation axis and comprising a positioning member for said support member, said positioning member being adapted to move, along said translational axis, a carriage relative to said cross piece and being adapted to move said support member relative to said carriage along a translational axis, said positioning member comprising a rotor means for enabling a rotation of said support member about an axis parallel to a translational axis of the approach member, said two translational axes of said positioning member not forming a zero angle therebetween and both being perpendicular to said translational axis of said approach member.

11. The device according to claim 10, in which a second end of said elbow coupling is in a same alignment with an end of a second line, said device further including means for connecting a second end of said elbow coupling with said end of said second line by movement along said same alignment of the end of said second line and the second end of said elbow coupling.

12. The device according to claim 11, wherein the device further includes a lockable connector means for providing connection and locking of said connector means between at least one of the ends of said coupling and one of the ends of the line.

13. The device according to claim 12, including means for controlling said connector for locking said connector from said main installation.

14. The device according to calim 10, wherein said approach member includes at least one pulley jack.

15. The device according to claim 10, having uprights thereon and wherein said approach member includes at least one jack having an axis extending substantially parallel to a translation axis of said approach member and said jack is disposed inside uprights of said device.

* * * * *